United States Patent [19]

Vidakovic

[11] 4,013,112

[45] Mar. 22, 1977

[54] ANCHOR PLATE TIRE HAVING A SUB-LUG EQUIPPED ANCHOR PLATE

[75] Inventor: Aleksandar Vidakovic, Libertyville, Ill.

[73] Assignee: International Harvester Company, Chicago, Ill.

[22] Filed: Sept. 2, 1975

[21] Appl. No.: 609,472

[52] U.S. Cl. .............................. 152/182; 152/191; 152/199; 152/226; 305/19; 305/54

[51] Int. Cl.[2] ................. B60C 27/20; B62D 55/28

[58] Field of Search .......... 152/169, 180, 182, 185, 152/187, 190, 191, 198, 199, 200, 201, 226–230; 305/15, 19, 29, 39, 57, 54

[56] References Cited

UNITED STATES PATENTS

| 3,773,394 | 11/1973 | Grawey | 305/19 |
| 3,776,291 | 12/1973 | Boggs | 152/182 |
| 3,899,220 | 8/1975 | Grawey et al. | 152/182 |

*Primary Examiner*—Drayton E. Hoffman
*Attorney, Agent, or Firm*—Douglas W. Rudy; Floyd B. Harman

[57] ABSTRACT

A pneumatic spacer and cushioning tire assembly is provided with a carcass component and a tread section component. A plurality of anchor plates are molded into the tire carcass in the crown section thereof. The anchor plates are further retained in position on the tire carcass by an elastomer insulated inextensible filament reinforced ply composed of a plurality of inextensible filaments which comprise a portion of the tread section component.

The anchor plates are equipped with fastener receiving means which are provided to allow the fastening of traction plates to the anchor plates. Traction plates, once attached firmly to the anchor plates, protect the tire from damage as well as providing increased traction.

The complete tire assembly provides an armored resilient ground engaging unit for use on construction equipment.

3 Claims, 7 Drawing Figures

U.S. Patent  Mar. 22, 1977  Sheet 1 of 2  4,013,112
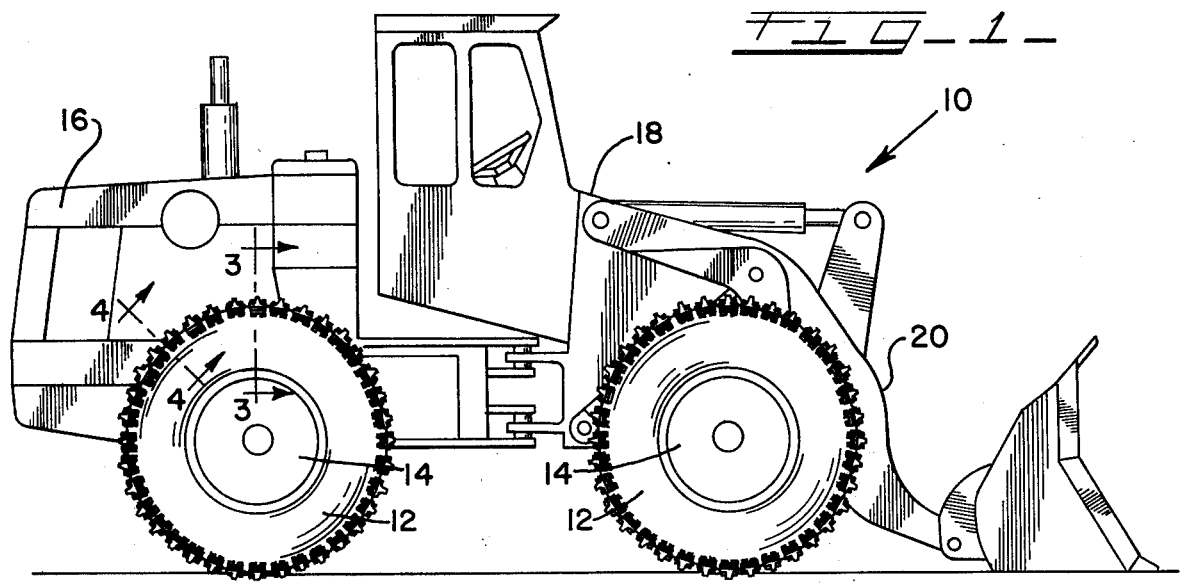
FIG_1_
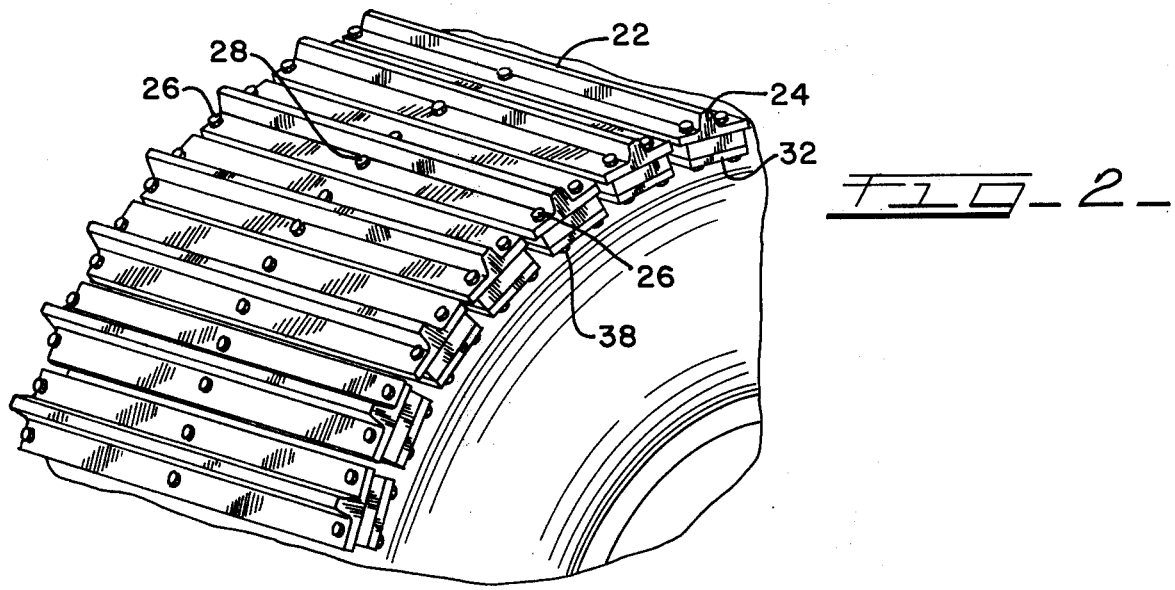
FIG_2_
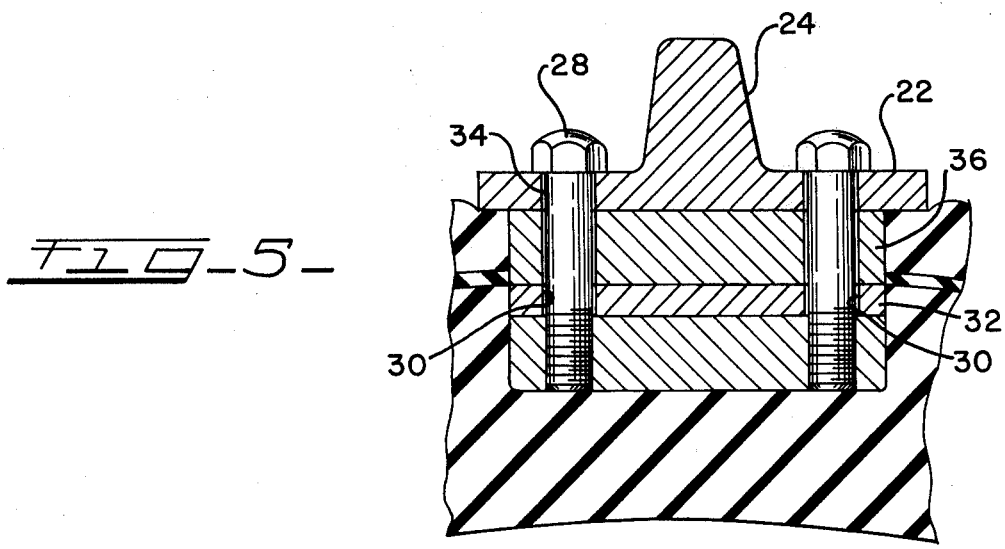
FIG_5_

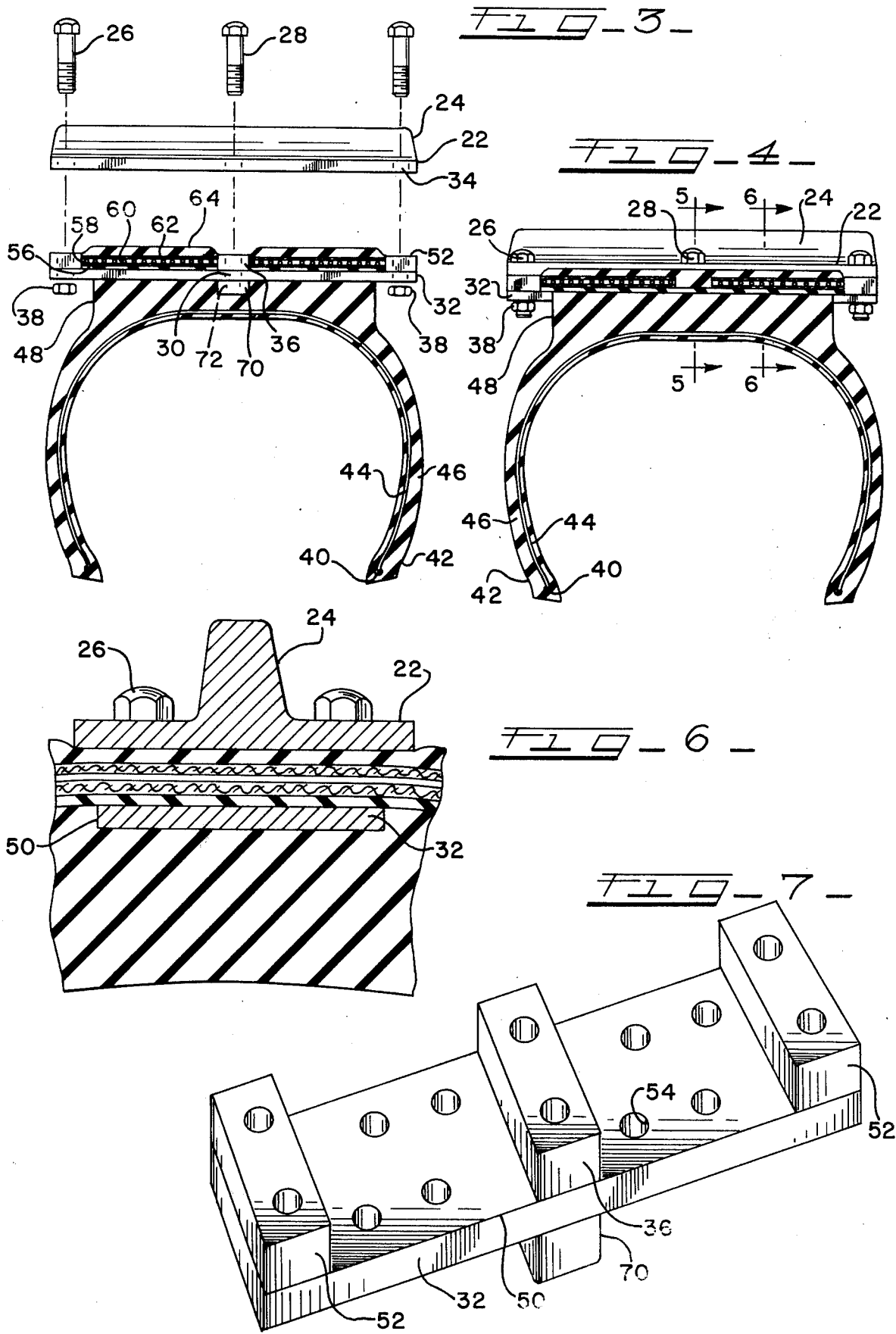

ANCHOR PLATE TIRE HAVING A SUB-LUG EQUIPPED ANCHOR PLATE

CROSS-REFERENCES TO RELATED APPLICATIONS

This application is related to the application entitled ANCHOR PLATE TIRE invented by Aleksandar Vidakovic and Rodney H. Anderson Ser. No. 609,471, filed Sept. 2, 1975, the same day as this application.

BACKGROUND OF THE INVENTION

1. Field of the Invention

This invention relates to armored tires having a traction plate equipped ground engaging surface. More specifically this invention is concerned with the implantation of a specially equipped anchor plate in the carcass of a tire to provide a high strength mounting means for the traction plates. The anchor plates are molded between the inner plies of the tire and an elastomer insulated fabric and inextensible filament anchor ply structure.

2. Description of the Prior Art

Pneumatic tired vehicles which work in construction and other harsh environments are oftentimes driven on extremely detrimental road surfaces. Numerous articulated and conventional loaders, scrapers, dump trucks and graders, etc. operate in rock quarries, mines, foundries, refuse yards and other sites where the tires of the vehicle are continually exposed to puncture producing and wear inducing elements.

As the tires for large construction type vehicles are expensive it is economically advantageous to minimize exposure to tire damaging elements. One way that this tire wear problem may be alleviated is through the use of endless track vehicles. Conventional two tracked vehicles are equipped with endless tracks made up of traction or grouser plates and linking members which are normally driven by sprocketed wheels. Two track vehicles have high tractive efficiency, good stability, and good floatation characteristics while also having the advantage of infrequent track failure resulting from damage caused by the working environment. Bulldozers, power shovels, and cranes are often seen with dual endless track ground engaging means.

Conversely, endless track vehicles do have certain disadvantages that make them undesirable in some material handling situations. Two track vehicles have speed limitations due to the track assembly and are not capable of adequately dampening road shocks and vibrations. The amount of heat generated by the track links may be severe enough at high speeds to cause premature failure of the tracks.

In a vehicle having pneumatic tires the tires are capable of relatively high speed while also providing a major portion of the shock dampening function of the vehicle suspension. Thus for construction vehicles, such as loaders and dump trucks, which operate at high speed a pneumatic tire is economically advantageous. In order to realize the benefits of the endless track and the pneumatic tire it is highly desirous to combine the armor protection of a traction plate with the high speed capability of a pneumatic tire.

Many attempts to armor tires using plates held in position on the tire by means of chains, links, cables, etc. have been tried for special applications. Specific examples of tracks linked over tires are shown by U.S. Pat. No. 3,601,212 to Peterson, et al and to U.S. Pat. No. 3,612,624 to Stedman. These adaptations of linked tracks and pneumatic tires provide for a shock dampening advantage as well as tire armoring, however, the linked track limits the speed of the vehicle due to the high frictional heat build-up in the linking components which may cause a high rate of wear.

The troublesome link track systems of early evolutionary developments have been improved upon by several inventions as typified by the invention disclosed in U.S. Pat. No. 3,773,394 to Grawey. In this invention the traction plates are fastened to anchor plates which accommodate a plurality of independent circumferential belts. This belt structure is positioned on the crown of a pneumatic tire and the tire is inflated into the belt and track assembly. The belts have been formed and cured before their assembly with the anchor plates and traction plates. A continuous interior belt surface contacts the pneumatic tire carcass and provides frictional engagement therewith.

Although the state of the art flexible belt system of linking track shoes together is operational this two piece tire and belt system does present some drawbacks. For instance, as the circumferential belts are on the exterior surface of the tire carcass they are exposed to abrasive dirt and foreign material which may shorten the service life of the expensive belt assembly.

Also the two piece belt and tire embodiments depend on contact pressure between the tire carcass and the belt assembly for the transmission of torque as high torque forces present between the vehicle tire and the ground may cause the belt to slip on the tire thus decreasing efficiency. The driving lugs and/or alignment cavities of many contemporary embodiments which are molded into the tread surface of the tire to accommodate complementary protrusions on the exterior belt surface are not necessary with the anchor plate tire as presented herein.

The armored tire of this invention is adapted to be mounted on a wheel for use on an earthworking or transporting vehicle. The tire comprises a carcass portion including a crown section wherein are molded a plurality of anchor plates retained in their location by anchor plies positioned circumferentially around the tire also molded into the crown portion of the tire carcass. Traction shoes or plates are fastened to the molded-in anchor plates and present a traction improving, puncture and damage preventing armored surface.

The attachment of the traction plates to the anchor plates is accomplished through the use of attaching bolts which pass through apertures in the traction plates and then through apertured end spacers carried on the top surface of the anchor plates. Attachment bolts also pass through a center spacer located midway between the end spacers. The bolts passing through the end spacers are retained by means of lock washers and nuts while the bolts passing through the center spacer pass into a threaded lug, hereinafter referred to as a sub-lug, centrally located on the bottom of the anchor plate.

The sub-lug disposition maximizes the central bolt connection as well as providing for the uniform transmission of driving torque. The uniformity of the torque transmission (transmission of torque through the anchor plate at the ends and center portions thereof) will result in a uniform loading of the anchor plate thus increasing the life of the plate. The center spacer and sub-lug, by allowing for a longer bolted connection, will allow for equalization of torque transmission at the center and end points of the anchor plate. The stiffness of all three attaching points are equalized by having the effective volume of each point equalized thus allowing for the equalized spring rates.

The present invention does not depend on external links or independent belts in order to provide attachment of the traction plates to the tire. The belt structure is not necessary as the anchor plates for locating the traction plates are molded into the tire carcass itself. In this embodiment the anchor plates and related anchor plies are not exposed to working environment contaminents and projectiles which may cause damage or premature belt failure.

It is, therefore, an object of this invention to present an armored tire which has track retaining anchor plates molded integrally with the carcass of the tire.

Another significant object of this invention is to present an armored tire that has no external belts, chains, or links.

A further object of this invention is to provide an armored tire that is compatible with large earthmoving vehicles and allows relatively high speed, good shock and vibration dampening characteristics, good tractive efficiency and excellent wear and damage resistance.

Other advantages of the anchor plate tire herein disclosed are that the traction plates which would be fastened to the anchor plates will not move in either a circumferential or lateral direction as may happen with a two piece tire belt design. Also the rotational stability of the anchor plate around its own axis is greatly improved due to the integrity of the design. This consequently improves the stability of any traction plate or grouser plate fastened to the anchor plate.

The life expectency of the anchor plies is also increased as the anchor plies will not be exposed to creeping and rotation of the anchor plates. The rigidity of the anchor plies contributes to decreasing the fatigue of the cables, fabric, and elastomer in the ply thus increasing the life of the tire.

It is further an object of this invention to provide traction plate attaching means having high strength and deflection resistance by the implementation of a centrally disposed sub-lug located on the bottom of the anchor plate. This allows the use of a longer bolt and also allows interchangeability between the outboard bolts and the inboard bolts.

Still another advantage of this invention is the ease of assembly when contrasted to the two piece belt-tire embodiment. The critical relationship between the outside diameter of the tire and the inside diameter of the enveloping belt is not present in the integral anchor plate tire.

SUMMARY OF THE INVENTION

In accordance with the invention a pneumatic tire is provided with a plurality of anchor plates molded into the carcass of the tire in the crown section thereof, between the inner construction plies or body plies and an anchor ply assembly. The anchor plates are provided with means, including a sub-lug centrally located on the bottom of the anchor plate, to allow fastening of traction plates thereto and also may be equipped with optional structural bonding holes. A set of spacers, including two end spacers and one center spacer, are provided to locate the traction plates to the anchor plates while providing controlled compression of the anchor plies.

Anchor plies are of a laminated construction consisting of elastomer plies, fabric plies, and nonextensible reinforcing filaments encased in an elastomer and are integrally molded with tire carcass. The reinforcing filaments are positioned to run circumferentially around the tire.

This anchor plate tire is an integrally molded conventional pneumatic tire incorporating a bead type construction tire, an anchor plate arrangement and an anchor ply into an integral unit. Traction plates are fastened to the anchor plates thus providing the assembly with an armored traction surface.

BRIEF DESCRIPTION OF THE DRAWINGS

The aforesaid and additional objects and advantages of the invention will be more clearly understood from the following detailed description thereof when read in conjunction with the accompanying drawings, in which:

FIG. 1 is a side elevation view of a representative vehicle equipped with the anchor plate tire of this invention;

FIG. 2 is a perspective view of a portion of a wheel and anchor plate tire assembly;

FIG. 3 is a cross sectional view through plane 3—3 of FIG. 1 of an anchor plate tire having the traction plate and its fastening means disassembled;

FIG. 4 is a cross sectional view taken through plane 4—4 of FIG. 1 of an anchor plate tire having a traction plate in position;

FIG. 5 is a cross sectional view taken through plane 5—5 of FIG. 4 of the area in proximity to a single anchor plate;

FIG. 6 is a cross sectional view taken through plane 6—6 of FIG. 4 in the area in proximity to a single anchor plate; and FIG. 7 is an isometric view of an anchor plate of the invention.

DETAILED DESCRIPTION OF THE INVENTION

Referring first to FIG. 1 there is presented an earthworking vehicle generally 10, specifically a four wheel drive articulated loader, which has anchor plate tires fitted thereto. The earthworking vehicle shown is equipped with an engine supporting rear section 16, a cab supporting front section 18 and a loader boom and bucket assembly 20 used for excavating purposes. The right front 12 and identical right side rear, also 12, anchor plate tires are shown. The identical left side tires are hidden on the other side of the vehicle. The anchor plate tires are mounted on wheels 14 carried on the forward and rearward drive axles. A detailed view of the components included in the structure of the invention may be had upon examination of the annotated FIGS. 2 through 7.

Various views of traction plates 22 are presented. The traction plates are the actual ground engaging portion of the tire assembly. The figures show a single lug traction plate, the lug being the projection 24, however, it should be understood that the design of the traction plate surface is not critical to the concept behind the anchor plate tires. The traction plates may have a plurality of lugs arranged in a variety of configurations as desired.

The traction plates 22 are retained in position on the carcass of the anchor plate tire through the use of a fastening means such as bolts. In a preferred embodiment (FIGS. 2–7) the centrally located bolts 28 are driven into tapped apertures 72 in a tapped or threaded sub-lug 70 centrally located on the bottom side of the anchor plate 32. These bolts pass through a central spacer 36 which is affixed to the anchor plate 32.

The centrally located threaded sub-lug which may be welded to or formed on the underside or the bottom of the anchor plate provides for and allows the use of a bolt that is the same length as the outboard bolts. Although a short bolt could be threadably secured to the center spacer if it were equipped with threads (which it is not in this embodiment) a stronger and more effective attachment is provided when using a long bolt screwed into the threaded sub-lug. The long bolt maximizes the strength of the traction plate to anchor plate connection by allowing for bolt stretching. This threaded sub-lug is a spacer similar to the central spacer 36 which has been provided with a pair of threaded apertures which complement the apertures of the central spacer. The threaded sub-lug, by allowing for a longer bolted connection will allow for the equalization of torque transmission thus not overloading the end spacers or the center spacer and sub-lug. The sub-lug 70 may be welded to or formed on the underside or bottom of the anchor plate 32.

The outboard bolts 26 pass first through mounting apertures 34 in the traction plates 22 then through apertured end spacers 52 which may be fixed to the anchor plates 32, which are also drilled to allow the passage of the outboard bolts 26. The outboard bolts are provided with nuts 38 which retain the traction plates 22 in position.

The central bolt 28 may be identical in length and size to the outboard bolts 26.

The anchor plates 32 are molded and cured into the carcass of the tire.

The tire shown in this embodiment is of radial construction having bead wire bundles 40 (FIGS. 3 and 4) in the bead section 42 of the carcass. Body plies 44 are composed of filaments which run transversely from bead to bead at virtually right angles thereto. The body plies of the tire are surrounded by an elastomer composition which makes up a portion of the tire sidewall 46 and the tread section 48 under the anchor plate 32.

The instant invention is equally adaptable to all known tire constructions. Conventional bias ply carcasses and toroidal style radial carcasses may be utilized with equally beneficial results. The tire carcass construction used in this preferred embodiment may not be construed to limit the scope of this invention.

A relatively flat elastomer surface is formed in the crown portion of the carcass. This flat portion may be associated with the normal tread surface of a conventional tire.

The anchor plates 32 are molded into the tire carcass on top of the crown portion thereof.

Anchor plates are generally rectangular having relatively flat top and bottom surfaces.

The anchor plate is built around a base portion which is a rectangular flat plate having a length of several times its width and a thickness a fraction of its width. These dimensions are determined per design as necessary. The anchor plate is of sufficient length to allow protrusion of the end portions thereof past the edge extremes of the tire carcass in the crown area. The anchor plate may protrude at least sufficiently far to enable the installation of the outboard fastening means, specifically outboard bolts 26 and nuts 38. The nuts may be either the self-locking type as shown or may be dependent on washers (not shown) to ensure adequate holding ability. The intersecting planes, such as the top surface and the sides, as well as the bottom surface and the sides, are radiused as seen at 50 in FIG. 6 and FIG. 7 to prevent internal damage to the tire. The apertured end spacers 52, the central spacer 36, the sub-lug 70, as well as the radiused edges 50 are clearly shown in the anchor plate embodiment of FIG. 7. Also shown are a plurality of structural bonding holes similar to the bonding hole 54. The bonding holes allow for the extrusion of elastomer thereinto during the molding of the tire to further assist in positioning the anchor plate. The number of bonding holes may be varied (or entirely deleted) according to the design requirements of the carcass elastomer.

Returning to the cross sectional figures the anchor plies will be further explained. In FIG. 3 an elastomer lining 56 is positioned between a first fabric breaker ply 58 and the top flat surface of the anchor plate 32. Between anchor plates the elastomer lining 56 becomes continuous with the elastomer of the thread section 48.

A stabilizer ply 60 comprising a plurality of inextensible filaments encapsulated or insulated in elastomer is positioned between the first fabric breaker ply 58 and a second fabric breaker ply 62. The inextensible filaments of the stabilizer ply would most aptly be metallic wires or cables, however, the use of a synthetic inextensible filament is also contemplated.

An elastomer cap 64 completes the anchor ply assembly. The cap is the outermost component of the assembly. The cap top surface protrudes above the upper surface of the aperture end spacers 52 and the central spacer 36 such that when the traction plates 22 are fastened to the anchor plates 32 the elastomer cap on each of the anchor plies is compressed to provide positive sealing between the traction plate and the tire assembly. Traction plates so mounted would transmit a degree of driving torque by friction with the tire assembly although a greater percentage of driving torque is transmitted through the bolted connections.

Note that in FIG. 4 the elastomer of the cap 64 appears to project into the lower surface of the traction plate 22. Actually the traction plate is not deformed in this view but the elastomer cap 64 has been extruded between adjacent traction plates in plane 4—4 of FIG. 1 thus giving this impression.

The anchor plates previously discussed can be fabricated by assembling the various components and fastening, as by welding, them together. Alternatively, the anchor plates could be formed in a unitized manner such as by casting or forging. Either construction method would provide an acceptable anchor plate.

An alternative central spacer is also contemplated by this invention although it is not shown in the drawing figures. The central spacer 36 of FIG. 7 may be replaced with a pair of round spacers having apertures therethrough. This pair of pipe-like or collet members would allow the passage of the fastening bolts 28 while providing the spacing function of the rectangular solid central spacer 36.

It is important to understand that all the components of the tire assembly, exclusive of the traction plates and the fastening means, have been assembled as a unit before being molded and cured. After being assembled the tire assembly is cured and the anchor plates and plies are unified with the carcass. The traction plates may be bolted to the anchor plates anytime after the tire has been cured. The traction plates of course would be replaceable and interchangeable such that in the event of a traction plate failure the defective traction plate could be removed from the anchor plate and a new traction plate could be bolted or fastened into its place. Also traction plates may be changed to more aggressive or more operational configurations as necessary.

Thus it is apparent that there has been provided in accordance with the invention, an anchor plate tire having a sub-lug equipped anchor plate that fully satisfies the objects, aims and advantages set forth above. While the invention has been described in conjunction with specific embodiments thereof, it is evident that many alternatives, modifications and variations will be apparent to those skilled in the art in light of the foregoing description. For instance, it is conceivable that an anchor plate may be equipped with more than a single spacer and sub-lug between the apertured end spacers thus necessitating the need for several side-by-side anchor plies. Accordingly, the invention as disclosed above is intended to embrace all such alternatives, modifications, and variations as fall within the spirit and broad scope of the appended claims.

What is claimed is:

1. In combination with a unitized pneumatic tire having a carcass portion including sidewall sections and a crown portion, and a plurality of radially disposed anchor plates having a plurality of apertures positioned on said crown portion, and anchor plies circumferentially disposed around said crown portion of said pneumatic tire on top of said anchor plates wherein the carcass portion, the radially disposed anchor plates and the anchor plies are molded, formed and cured together, the improvement comprises:
   a sub-lug located on the bottom surface of said anchor plate equally spaced between each end thereof and further having a set of tapped apertures which may be aligned with the apertures of said anchor plate.

2. In combination with a unitized pneumatic tire having a carcass portion, a set of apertured anchor plates, and anchor plies, all formed, molded and cured as a unitized assembly, and a set of apertured traction plates for attaching to said anchor plates with bolts, the improvement comprising:
   a sub-lug having a set of tapped apertures welded to the carcass contacting side of said anchor plate midway between the extreme ends of said anchor plate such that attaching bolts passing through said traction plate and said anchor plate may be threadably engaged with the tapped apertures of said sub-lug whereby said traction plate will be secured to said anchor plate.

3. An armored ground engaging pneumatic tire having a carcass portion, a set of apertured anchor plates and at least one anchor ply, all formed, molded and cured as a unitized assembly, and a set of apertured traction plates for attaching to said anchor plates with bolts, the anchor plates further comprising;
   a rectangular base portion having a top and a bottom surface, further having a generally rectangular cross section where the corners are arcuate, and being provided with a plurality of apertures including a set of apertures at each extreme end of said base portion;
   a first end spacer being rectangular and having a rectangular cross section having a length approximately equal to the width of said base portion, further having a set of apertures therethrough which align with the apertures of said base portion when said first end spacer is position at an extreme end of said base portion;
   a second end spacer being rectangular and having a rectangular cross section, having a length approximately equal to the width of said base portion, further having a set of apertures therethrough which align with the apertures of said base portion when said second end spacer is positioned at an extreme end of said base portion;
   a central spacer being rectangular and having a rectangular cross section, further having a length approximately equal to the width of said base portion, and further having a set of apertures therethrough which align with apertures of said base portion when said central spacer is positioned midway between said first and said second end spacer on the top surface of said base portion of said anchor plate;
   a sub-lug located on the bottom surface of said base portion being rectangular and having a rectangular cross section, further having a length approximately equal to the width of said base portion, and further having a set of tapped apertures therein which align with apertures of said base portion and said central spacer when said sub-lug is positioned on the bottom surface of said base portion between the ends thereof whereby said apertured traction plates may be attached to said anchor plates through the use of a plurality of equal length bolts.

* * * * *